(12) United States Patent
Gasser et al.

(10) Patent No.: US 7,786,635 B2
(45) Date of Patent: Aug. 31, 2010

(54) MOTOR FOR HIGH MOISTURE APPLICATIONS

(75) Inventors: Patrick Gasser, Port Washington, WI (US); Wesley K. Anderson, Cedarburg, WI (US); Steven Stretz, Hubertus, WI (US); Jason Kreidler, Sheboygan Falls, WI (US)

(73) Assignee: Regal Beloit Corporation, Beloit, WI (US)

( * ) Notice: Subject to any disclaimer, the term of this patent is extended or adjusted under 35 U.S.C. 154(b) by 318 days.

(21) Appl. No.: 11/955,853

(22) Filed: Dec. 13, 2007

(65) Prior Publication Data

US 2009/0152962 A1   Jun. 18, 2009

(51) Int. Cl.
*H02K 5/00* (2006.01)

(52) U.S. Cl. .................. 310/89; 310/43; 310/87; 310/88

(58) Field of Classification Search ............ 310/68 R, 310/87, 88, 89, 43; *H02K 5/00*
See application file for complete search history.

(56) References Cited

U.S. PATENT DOCUMENTS

| | | | |
|---|---|---|---|
| 2,961,555 A | 11/1960 | Towne | |
| 3,058,156 A | 10/1962 | O'Connor | |
| 3,210,577 A | 10/1965 | Hogue | |
| 3,256,590 A | 6/1966 | Myers | |
| 3,436,569 A | 4/1969 | Flaherty, Jr. et al. | |
| 3,544,240 A | 12/1970 | Rundell | |
| 3,631,275 A | 12/1971 | Conrad et al. | |
| 3,675,057 A | 7/1972 | Pleuger | |
| 3,688,137 A * | 8/1972 | Filhol | 310/43 |
| 3,887,826 A | 6/1975 | Apostoleris | |
| 4,015,154 A | 3/1977 | Tanaka et al. | |
| 4,048,530 A | 9/1977 | Kaufman, Jr. | |
| 4,067,562 A | 1/1978 | Weber | |
| 4,128,527 A | 12/1978 | Kinjo et al. | |
| 4,287,662 A | 9/1981 | Otto | |
| 4,291,455 A | 9/1981 | Schnyder | |
| 4,352,897 A | 10/1982 | Ogata et al. | |
| 4,381,464 A | 4/1983 | Schnyder | |
| 4,387,311 A | 6/1983 | Kobayashi et al. | |
| 4,387,313 A | 6/1983 | Yamamoto et al. | |
| 4,437,027 A | 3/1984 | Yamamoto et al. | |
| 4,456,844 A | 6/1984 | Yamamoto et al. | |
| 4,546,130 A | 10/1985 | Nishida et al. | |
| 4,549,105 A | 10/1985 | Yamamoto et al. | |

(Continued)

*Primary Examiner*—Quyen Leung
*Assistant Examiner*—John K Kim
(74) *Attorney, Agent, or Firm*—Armstrong Teasdale LLP

(57) ABSTRACT

A motor that includes a motor frame, an end-bell assembly, a stator assembly, and filling material is described. The stator assembly is placed within the frame such that at least one open area is defined between an inner diameter of the stator assembly and an inner diameter of the motor frame. The at least one end-bell assembly is attached to the motor frame, forming an inside area adjacent the motor frame and the stator assembly. The motor also includes a material configured to fill the at least one open area and the inside area of the at least one end-bell assembly for the purpose of sealing the stator assembly and the inside area associated with the at least one end-bell assembly. The material assists in a bonding and attachment between any two or more of the stator assembly, the motor frame, and the at least one end-bell assembly.

10 Claims, 6 Drawing Sheets

U.S. PATENT DOCUMENTS

| | | | |
|---|---|---|---|
| 4,585,966 A | 4/1986 | Nishida et al. | |
| 4,651,039 A | 3/1987 | Yamamoto et al. | |
| 4,998,865 A * | 3/1991 | Nakanishi et al. | 417/423.7 |
| 5,095,612 A | 3/1992 | McAvena | |
| 5,233,248 A * | 8/1993 | Kawamura et al. | 310/88 |
| 5,313,698 A | 5/1994 | Schaeftlmeier et al. | |
| 5,394,043 A * | 2/1995 | Hsia | 310/90 |
| 5,415,892 A | 5/1995 | Nishizawa | |
| 5,532,533 A * | 7/1996 | Mizutani | 310/68 B |
| 5,739,600 A * | 4/1998 | Kobayashi et al. | 310/26 |
| 5,932,942 A * | 8/1999 | Patyk et al. | 310/58 |
| 6,040,647 A | 3/2000 | Brown et al. | |
| 6,100,615 A * | 8/2000 | Birkestrand | 310/75 C |
| 6,146,717 A | 11/2000 | Lienert et al. | |
| 6,359,354 B1 | 3/2002 | Watanabe et al. | |
| 6,608,414 B1 | 8/2003 | Conley | |
| 6,700,253 B1 * | 3/2004 | Ohnuma et al. | 310/89 |
| 6,798,091 B2 | 9/2004 | Kudou et al. | |
| 6,878,203 B2 | 4/2005 | Becherucci et al. | |
| 7,042,124 B2 | 5/2006 | Puterbaugh et al. | |
| 7,091,638 B2 | 8/2006 | Bevington | |
| 2005/0074548 A1 | 4/2005 | Puterbaugh et al. | |
| 2005/0214135 A1* | 9/2005 | Shibuya | 417/357 |
| 2006/0119197 A1 | 6/2006 | Puterbaugh et al. | |
| 2006/0152095 A1* | 7/2006 | Kikuchi et al. | 310/68 R |

* cited by examiner

MOTOR FOR HIGH MOISTURE APPLICATIONS

BACKGROUND OF THE INVENTION

This invention relates generally to electric motors, and more specifically, to methods and apparatus that configure motors for application in a high moisture environment.

It is known that certain electric motors tend to fail in wet or high moisture applications. Examples of such applications include those where there is an exposure to saltwater or where there are frequent cleanings and wash-downs near the motor with caustic solvents, such as might be found in food processing areas. In such applications, bearing and stator failures are common.

One known approach to mitigating these motor failures is to use gaskets, o-rings, sealing washers, and seals on assembled joints and on the motor shaft to control the amount of contaminates that are able to enter the motor. In other applications, a hydrophobic breather may be used to allow the motor to "breathe", without pulling in moisture.

Another known approach is to apply an encapsulating material on the stator to protect stators or stators inside frames. However, these motors do not incorporate the encapsulating material such that end-bell joints are sealed. Nor is the encapsulating material utilized to hold parts of the motor together or reduce the amount of air inside the motor for purposes of minimizing breathing.

BRIEF DESCRIPTION OF THE INVENTION

In one aspect, a motor that includes a motor frame, at least one end-bell assembly, a stator assembly, and a filling material is provided. The stator assembly is placed within the motor frame such that at least one open area is defined at a location between an inner diameter of the stator assembly and an inner diameter of the motor frame. At least one end-bell assembly is attached to the motor frame, thereby forming an inside area adjacent the motor frame and the stator assembly. The motor includes a material configured to fill the at least one open area and the inside area of the at least one end-bell assembly for the purpose of sealing the stator assembly and the inside area associated with the at least one end-bell assembly. The material assists in a bonding and attachment between any two or more of the stator assembly, the motor frame, and the at least one end-bell assembly.

In another aspect, a method for assembling a motor is provided. The method includes inserting a stator assembly, including a rotor bore, within a motor body, inserting a bore plug into the rotor bore, attaching an end-bell assembly to the motor body, and filling any open areas of the stator assembly, any open areas between the motor body and stator assembly, and any open areas between the end-bell assembly and the motor body with a material to seal the stator assembly and to seal or bond an interface between the end-bell assembly and the motor body.

DETAILED DESCRIPTION OF THE INVENTION

Figure 1:
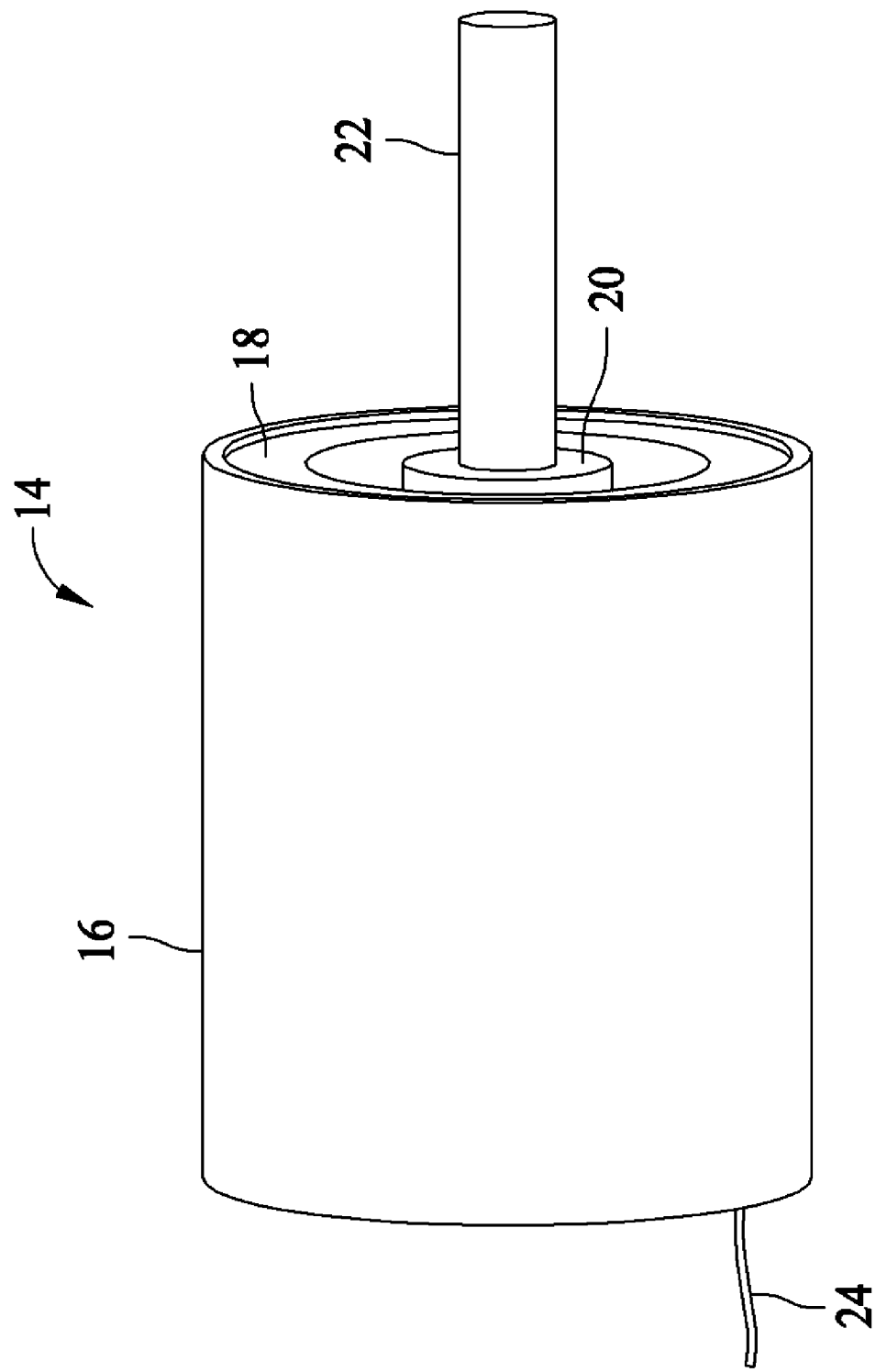
FIG. 1 is an illustration of an electric motor.

FIG. 1 is an illustration of an electric motor 14. Electric motor 14 includes a motor shell 16, which is sometimes referred to as a frame. Electric motor 14 may be, for example, but not limited to, a direct current motor, an alternating current motor, a split-capacitor motor, a capacitor-start motor, an electronically commutated motor, and a brushless direct current motor. Within motor shell 16, electric motor 14 includes a stator assembly 18 and a rotor 20. A shaft 22 extends through rotor 20. A power supply (not shown in FIG. 1) and/or a control module (not shown in FIG. 1) are coupled to electric motor 14 through a cable 24. However as described above, motors such as electric motor 14 have been known to fail in high moisture environments.

Figure 2:
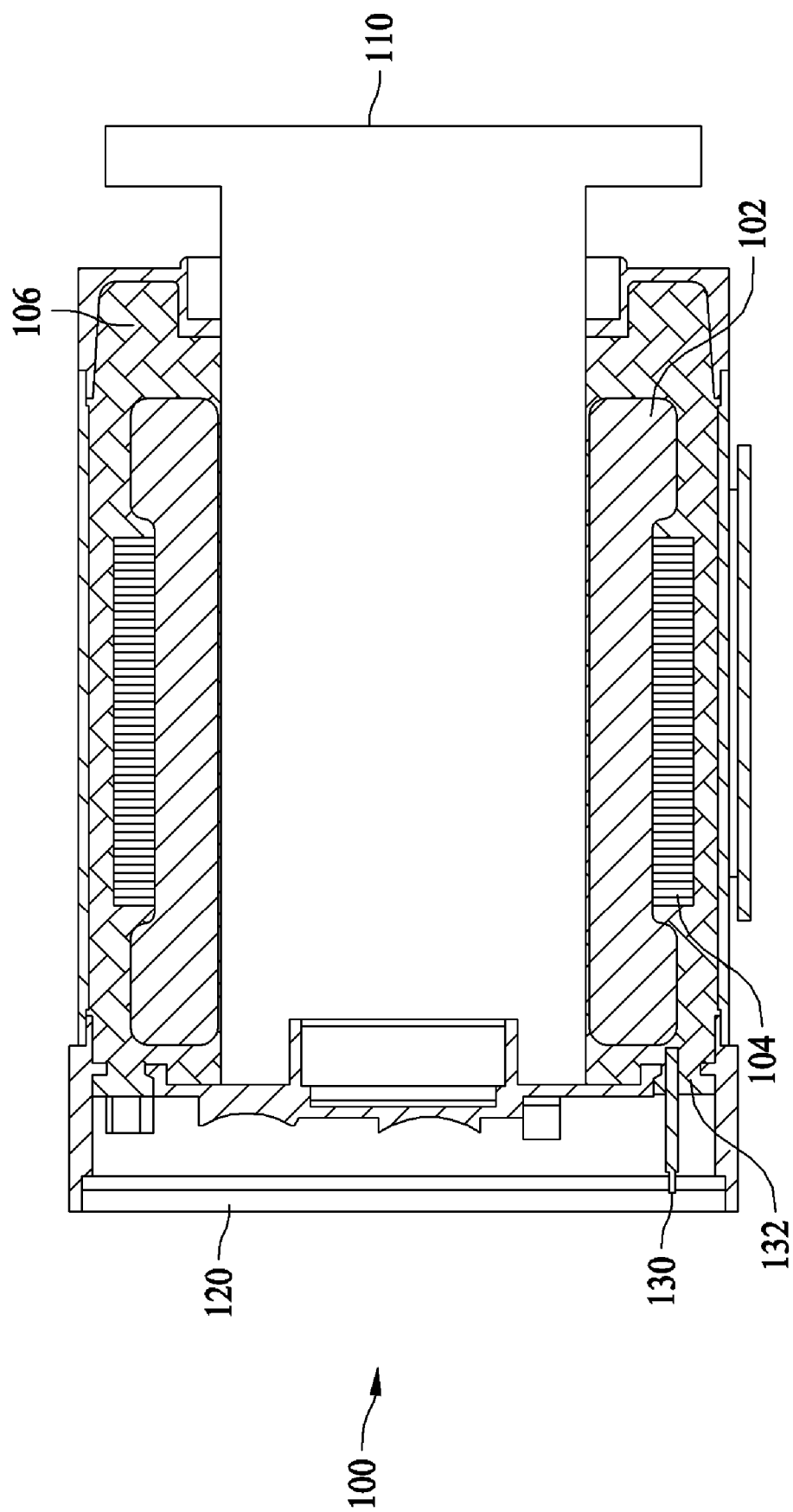
FIG. 2 is side cross-sectional view of a stator assembly within a motor body.

FIG. 2 is a cross-sectional view of a fully filled or potted motor body 100, or motor frame, which is configured for operation in a high moisture environment. Potted motor body 100 includes a plurality of materials, for example, a potting material 102 that is utilized to fill one or more open areas associated with a stator assembly 104 and a potting material 106 that is utilized to fill an area defined by the motor body 100 that is not occupied by the stator housing 104 or a rotor assembly (not shown in FIG. 2). When the various potting materials 102 and 106 are to be injected into their designated locations, a bore plug 110 is inserted into an area of the motor body 100 associated with a rotor (not shown). The bore plug 110 is utilized to maintain a placement of the potting materials 102 and 106, for example, during a curing process. As further explained herein, once the bore plug 110 is removed, a rotor assembly can be inserted into the motor body 100. While described herein as a potting material, it should be understood that such descriptions also refer to a resin compound or other material that could be utilized in the application described herein.

Figure 4:
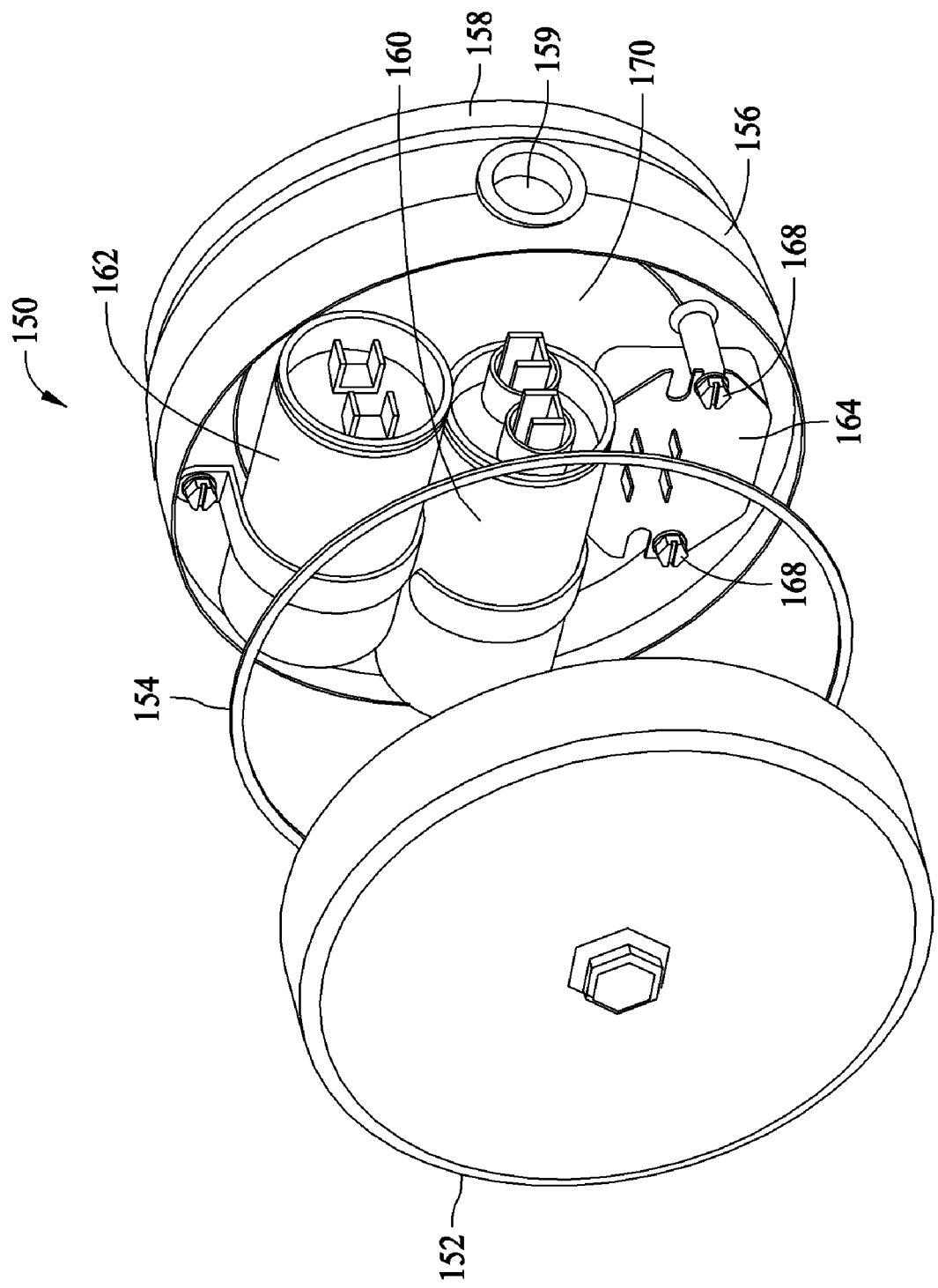
FIG. 4 is an exploded, perspective view of an end-bell assembly.

Stator leads 130 are used for connecting the stator assembly 104 to a power source located within an end-bell assembly (shown in FIG. 4). The stator leads 130, in one embodiment, extend from the stator assembly 104, through the potting material, and exit stator assembly 104 at a potted lead exit, denoted by 132. With such a configuration, outside contaminates and moisture cannot enter the motor body 100 through the potted lead exit 132.

Figure 3:
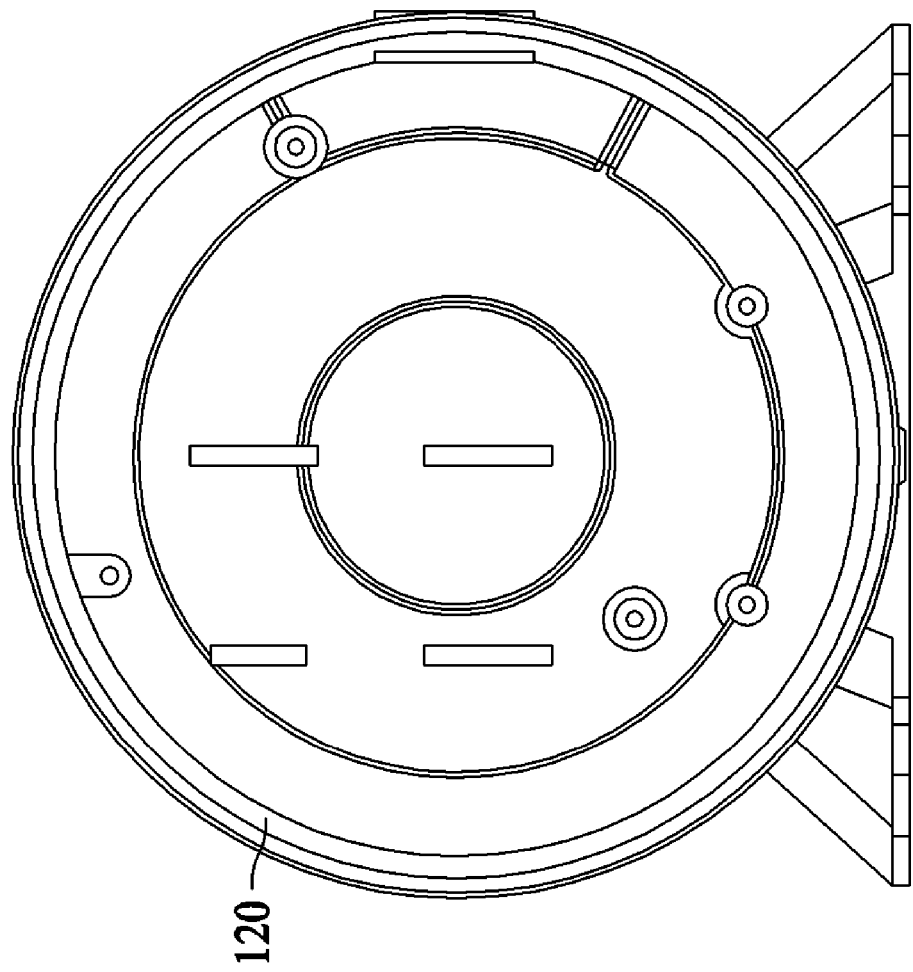
FIG. 3 is an end view of the motor body of FIG. 2.

FIG. 3 is an end view of a motor body 100 to which a motor end-bell assembly 150 (shown in FIG. 4) is to be attached. The motor end-bell assembly 150 includes electronic components utilized in the operation of a motor of which motor body 100 forms a part. As illustrated, a layer of potting material 120 (also shown in side view in FIG. 2) is incorporated into an end 130 of motor body 100 to seal an interface between a motor end-bell and motor body 100.

FIG. 4 is an exploded, perspective view of an end-bell assembly 150 that includes an end-bell cover 152, an o-ring 154, an end-bell 156 (containing the aforementioned electronic components), and a layer of potting material 158. In the exemplary embodiment, one end-bell assembly 150 is attached to motor body 100, however, multiple end-bell assemblies 150 may be included. Potting material 158 is utilized to seal an inside area of the end-bell assembly 150 that is, upon completion of motor assembly, adjacent to the motor body or frame 100 (shown in FIG. 2). End-bell 156 includes a port 159 through which a user of the motor makes their electrical connections.

The end-bell assembly houses capacitors 160 and 162, electronic switches 164, and any other auxiliary components, controls, and electrical connections necessary for motor operation, accessible by removing a threaded cover (e.g., end-bell cover 152), allowing for easy access for installation and servicing of the motor and auxiliary components. With this configuration, no additional junction box is required, at least for certain motor configurations, eliminating extra places for contaminates to get trapped within the motor. Additionally, FIG. 4 also illustrates mechanical assemblies 168 which are utilized for mechanical mounting of switches 164. As described above, the stator leads 130 (shown in FIG. 2) used for connecting to a power source are fully potted within connection area 170 utilizing potting material, so outside contaminates and moisture cannot enter the motor through this connection area 170.

In one embodiment, end-bell cover 152 is a threaded stainless steel cover for accessing the electrical connections that are utilized in a motor application. As described above, such connections are made through port 159. Such a configuration eliminates cover fasteners, which might be misplaced during motor installation. As mentioned above, one embodiment of the cover 152 incorporates o-ring 154 in addition to threads, to fully seal out contaminates from entering the conduit connection area.

The construction of a motor utilizing the potting materials as described with respect to FIGS. 2-4 reduces points of entry for contaminates, while also reducing the need for additional components used for sealing the motor, such as additional o-rings, gaskets, and sealing washers. Such construction further minimizes the amount of air inside the motor, so it is less likely to "breathe" and pull in moisture from the outside thereby protecting internal components, such as bearings and stator windings, from premature failure due to excessive moisture exposure.

Additionally, the potting materials described herein assist in bonding the stator assembly 104 and/or the end-bell assembly 150 to the frame (e.g., motor body 100), reducing the number of fasteners required to hold the motor together, while also extending the ability of the motor to handle increased mechanical vibration and shock loads.

As described with respect to FIGS. 2-4, the stator leads 130 used for connecting to a stator power source are fully potted utilizing the potting material 132, so outside contaminates and moisture cannot enter the motor body 100 through the conduit connection area. This motor configuration uses the end-bell assembly 150 as a form for the potting material, simplifying the tooling necessary for holding the potting materials in place during a curing process. The above described bore plug 110 is the only tooling needed for the potting material step of the motor fabrication process.

Figure 5:
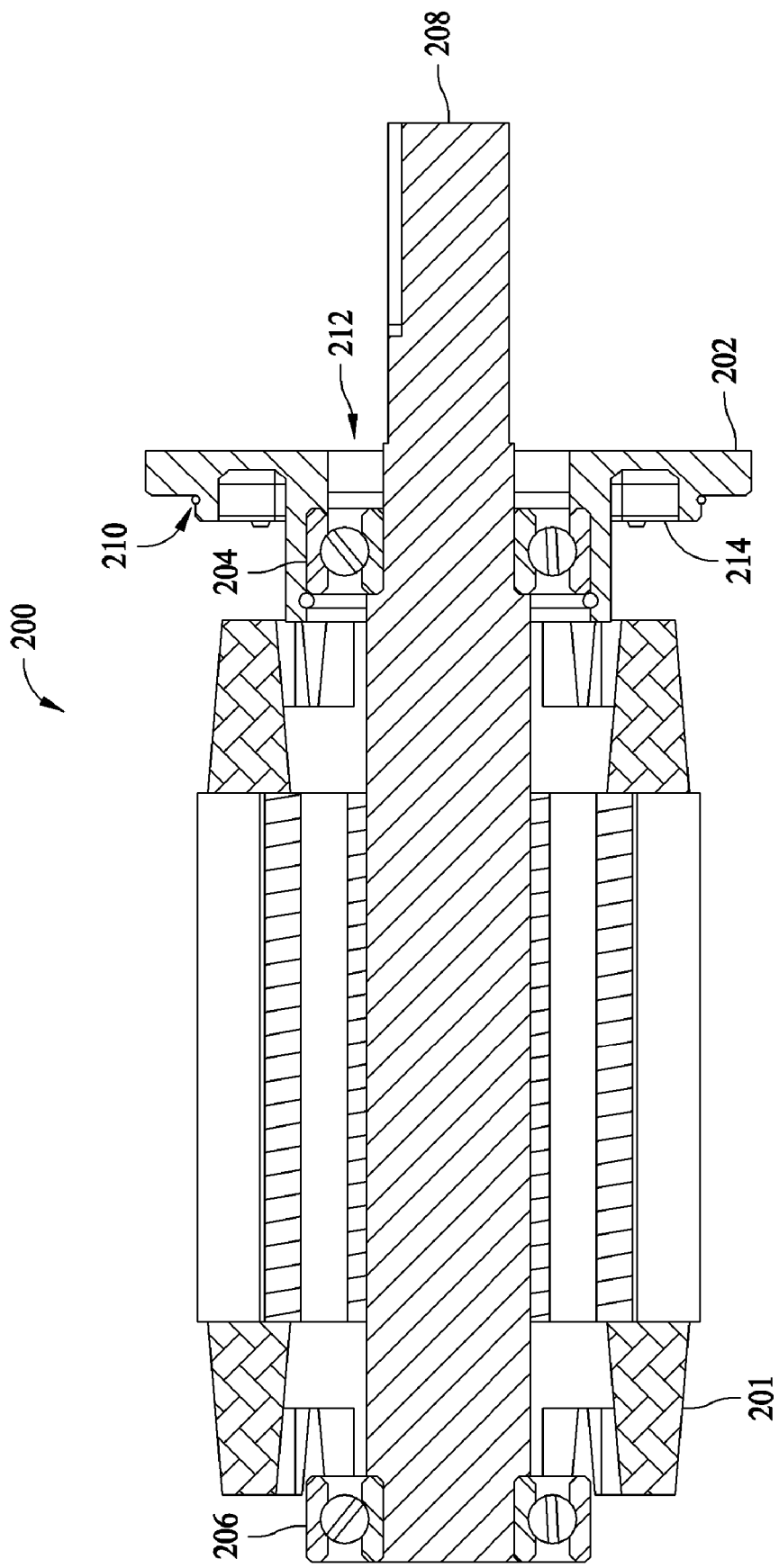
FIG. 5 is a side cross-sectional view of a rotor assembly configured for insertion into the motor body of FIG. 2.

FIG. 5 is a side cross-sectional view of an exemplary rotor assembly 200 configured for insertion into the motor body 100 described with respect to FIG. 2. Rotor assembly 200 incorporates a rotor core 201, a bearing carrier 202, bearings 204 and 206, and a shaft 208. Shaft 208 may be, for example, and not limited to, a two piece shaft and a press-fit shaft. In one embodiment, bearing carrier 202 provides an ease of motor assembly as well as ease in motor service and bearing replacement, while maintaining the above described sealing integrity of the motor frame 100 and end-bell assembly 150 enclosure.

Figure 6:
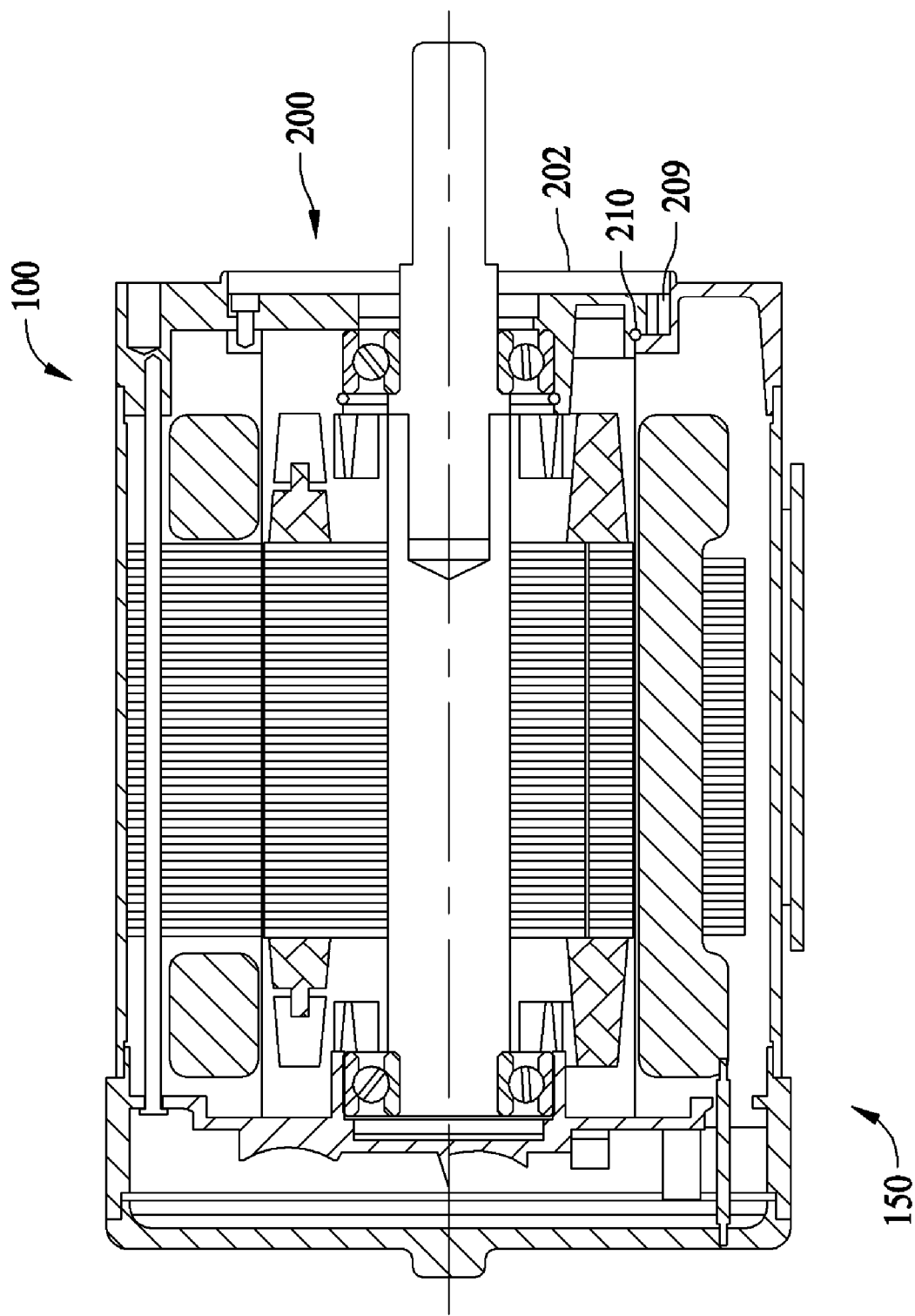
FIG. 6 is a side cross-sectional view of a rotor assembly inserted into the motor body, and the end-bell assembly attached to the motor body.

FIG. 6 is a side cross-sectional view of rotor assembly 200 inserted into the motor body 100, and the end-bell assembly 150 attached to the motor body 100. The bearing carrier 202 is configured such that it fits inside an end cap pilot 209, protecting the joint with the customer's mounting (gearbox, pump, etc.) when applicable. Bearing carrier 202 also incorporates an o-ring 210, and a shaft seal 212. The o-ring 210 engages the motor body 100 for sealing purposes.

The above described configuration helps prevent contaminates from entering the inside area of the motor. The o-ring 210 engages the motor body 100, and an end cap 214 engages the potting materials 102 and 106 for sealing purposes.

With respect to the above described embodiments, the number of points of entry for contaminates have been greatly reduced, as compared to other motor configurations, by using a resin based or other potting material to affix the end-bell assembly 150 and end cap 214 to the motor housing or body 100. This potting material seals the joints between the motor body 100 and the end-bell assembly 150 and the rotor assembly 200. The potting materials described herein minimize the amount of air inside the motor, so the motor is less likely to "breathe" and pull in moisture from the outside. The potting materials also assist in bonding the stator assembly 104 and end-bell assembly 150 to the motor body 100, which may extend the ability of the motor to handle increased vibration and shock loading, and also reduces the number of fasteners required for holding the motor together.

The configuration described herein uses the end-bell assembly 150 and the end cap 214 associated with the rotor assembly as a form for the resin, simplifying the tooling necessary for holding the potting material in place during curing. A simple bore plug 110, described above, is the only tooling for potting of the stator assembly 104. The rotor assembly 200, which is sometimes referred to as a cartridge, which includes the bearings 204 and 206, seals, shaft 208, and rotor core 201 can be removed from the motor body 100 and/or replaced as a single assembly. The configuration described herein may be applied to motors that include motor mounts, flanges, and/or motor feet for positioning and/or stabilizing the motor. Such a combination of features results in an improved motor design to improve the ability of the motor to survive hostile environments such as those where caustic solvents and frequent wash downs are likely to be utilized, such as in food processing applications.

While the invention has been described in terms of various specific embodiments, those skilled in the art will recognize that the invention can be practiced with modification within the spirit and scope of the claims.

What is claimed is:

1. A motor comprising:
   a motor frame;
   a stator assembly placed within said motor frame such that at least one open area is defined at a location between an inner diameter of said stator assembly and an inner diameter of said motor frame;
   at least one end-bell assembly attached to said motor frame, said at least one end-bell assembly comprising an end-bell and end-bell cover forming an inside area adjacent said motor frame and said stator assembly, said end-bell and said end-bell cover comprising a threaded interface there between; and
   a material configured to fill at least one open area and the inside area of said at least one end-bell assembly for the purpose of sealing said stator assembly and the inside area associated with said at least one end-bell assembly, said material assisting in a bonding and attachment between any two or more of said stator assembly, said motor frame, and said at least one end-bell assembly.

2. A motor according to claim 1 wherein said material comprises at least one of a resin compound and a potting material.

3. A motor according to claim 1 wherein said at least one end-bell assembly comprises openings through which stator leads providing connections to said stator assembly are made, the stator leads potted within said openings utilizing said material.

4. A motor according to claim 1 wherein at least one of said end-bell and said end-bell cover comprise stainless steel.

5. A motor according to claim 4 wherein said at least one end-bell assembly comprises an o-ring, said o-ring configured for placement between said end-bell and said end-bell cover.

6. A motor according to claim 4 wherein said at least one end-bell assembly comprises components and electrical connections necessary for motor operation, said components and electrical connections accessible through removal of said end-bell cover.

7. A motor according to claim 1 wherein said end-bell assembly comprises a port formed therein through which external electrical connections are made.

8. A motor according to claim 1 comprising a rotor assembly further comprising a bearing carrier having at least one end-cap configured to engage said material within said motor frame.

9. A motor according to claim 8 wherein said at least one end-cap and said at least one end-bell assembly are operable as forms to maintain a placement of said material during a curing process.

10. A motor according to claim 8 wherein said material is dispersed within said motor to create a seal between said motor frame and said rotor assembly.

\* \* \* \* \*